: US 9,173,115 B2
(45) Date of Patent: Oct. 27, 2015

(54) NETWORK DEVICE CONFIGURATION BY MOBILE DEVICE

(71) Applicant: Cisco Technology, Inc., San Jose, CA (US)

(72) Inventors: Nitya Sundareswaran, Sunnyvale, CA (US); Rohit Suri, Fremont, CA (US); Keerti Lakshminarayan, San Jose, CA (US); Lizhen Lin, San Jose, CA (US); Mei Tong, San Jose, CA (US); Manjunathaharsha Nagaraju, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 99 days.

(21) Appl. No.: 13/954,485

(22) Filed: Jul. 30, 2013

(65) Prior Publication Data

US 2015/0038129 A1 Feb. 5, 2015

(51) Int. Cl.
*H04M 3/00* (2006.01)
*H04W 24/02* (2009.01)
*H04W 88/18* (2009.01)

(52) U.S. Cl.
CPC .............. *H04W 24/02* (2013.01); *H04W 88/18* (2013.01)

(58) Field of Classification Search
CPC .................................................... H04W 8/245
USPC ........ 455/418–422.1, 550.1, 556.2, 561, 525, 455/524, 456.5, 41.1–42.1; 370/312, 395.5, 370/449, 254, 255, 338, 389
See application file for complete search history.

(56) References Cited

U.S. PATENT DOCUMENTS

| | | | |
|---|---|---|---|
| 8,068,441 B1 * | 11/2011 | Wiedmann et al. | 370/254 |
| 8,259,635 B2 | 9/2012 | Thubert et al. | |
| 8,310,955 B1 | 11/2012 | Wiedmann et al. | |
| 8,374,122 B2 | 2/2013 | Meier et al. | |
| 8,467,362 B2 | 6/2013 | Calhoun et al. | |
| 2013/0064175 A1 | 3/2013 | Pandey et al. | |
| 2013/0070641 A1 | 3/2013 | Meier et al. | |
| 2014/0162600 A1 * | 6/2014 | Chang et al. | 455/411 |

OTHER PUBLICATIONS

Juri Strumpflohner, Tried to Manually Enter Wifi Network Configurations into your Android Phone?, Sep. 22, 2010.
Slacy General, Wifi Credentials in a QR Code, Slacy's Blog, Jan. 21, 2011.
Vikram Aggarwal, WyScan: Android Wifi Configuration from Barcode, Updated Jun. 30, 2010.

* cited by examiner

*Primary Examiner* — Babar Sarwar
(74) *Attorney, Agent, or Firm* — Lempia Summerfield Katz LLC

(57) ABSTRACT

In one implementation, a wireless network device is automatically accessed and configured through a mobile device. The mobile device receives provisioning data encoded for installation and operation of a network device and decodes the provisioning data to identify at least one access parameter for the network device. The mobile device accesses a wireless network of the network device according to the access parameter. Once access has been established, the mobile device transmits a configuration signal including a network configuration setting through the wireless network to the network device for the installation of the network device. The network device is provisioned based on the network configuration setting.

17 Claims, 7 Drawing Sheets

NETWORK DEVICE CONFIGURATION BY MOBILE DEVICE

TECHNICAL FIELD

This disclosure relates in general to the field of network device configuration, or more particularly, to the field of network device configuration via a mobile communication device.

BACKGROUND

An access point is a device that allows mobile devices to connect wirelessly to a wired network through a wireless protocol. Access points are used in homes, businesses, and public places. The installation of an access point is not straight forward. The installation may require that a technician directly connect a cable from a computer to the access point. Some access points may be configured by proprietary software installed on a computer on the wired network. The basic settings for the access point are entered through the software. Some access points may be provisioned remotely, but a skilled technician is necessary to complete the process, and some active data connection to the access point is necessary. Challenges remain in simplifying the process for provisioning new access points on a network.

BRIEF DESCRIPTION OF THE DRAWINGS

Exemplary embodiments of the present embodiments are described herein with reference to the following drawings.

DESCRIPTION OF EXAMPLE EMBODIMENTS

Overview

In one embodiment, a mobile device is configured to receive provisioning data encoded for installation and operation of a network device and decodes the provisioning data to identify at least one access parameter for the network device. The mobile device is configured to access a wireless network of the network device according to the at least one access parameter and transmit a configuration signal including at least one network configuration setting through the wireless network to the network device for the installation of the network device.

EXAMPLE EMBODIMENTS

In commercial environments, wireless access points are often installed by an unskilled technician, who secures the physical device to the ceiling or another surface and connects power to the access point. When the lights or other indicators on the access point flash, the installation is complete. A network administrator or other skilled technician must visit the access point or connect to the access point remotely in order to provision the access point. For example, a skilled technician may be present on site for some basic network configurations (such as IP address) to ensure the access point can be accessed remotely.

In home environments, access points may be installed using a browser-based configuration wizard. To configure the access point, the user connects the access point to a computer with an Ethernet cable. The user accesses the access point through a web browser (e.g., by entering the default address of the access point) and provides configuration information. Other access points may include separate software packages for the configuration program.

In both commercial and home settings, the process of provisioning a wireless access point may involve a wired connection between the access point and a computer and/or a complex process through a remote service provider. The following embodiments provide automatic access point provisioning with limited user involvement. A technician receives a scannable image encoded with the network settings for the access point. Using a mobile device, the technician captures the image with a camera or scanner. Data encoded in the image allows the mobile device to wirelessly connect to the access point and configure the access point without any other data connection. Alternatively, the mobile device directly receives the network settings for the access point over a cellular network. The connection of the mobile device to the access point may be automatic and/or the configuration of the access point by the mobile device may be automatic. The term "automatic" is without additional intervention or without input by a human other than to activate the connection and/or configuration.

Figure 1:
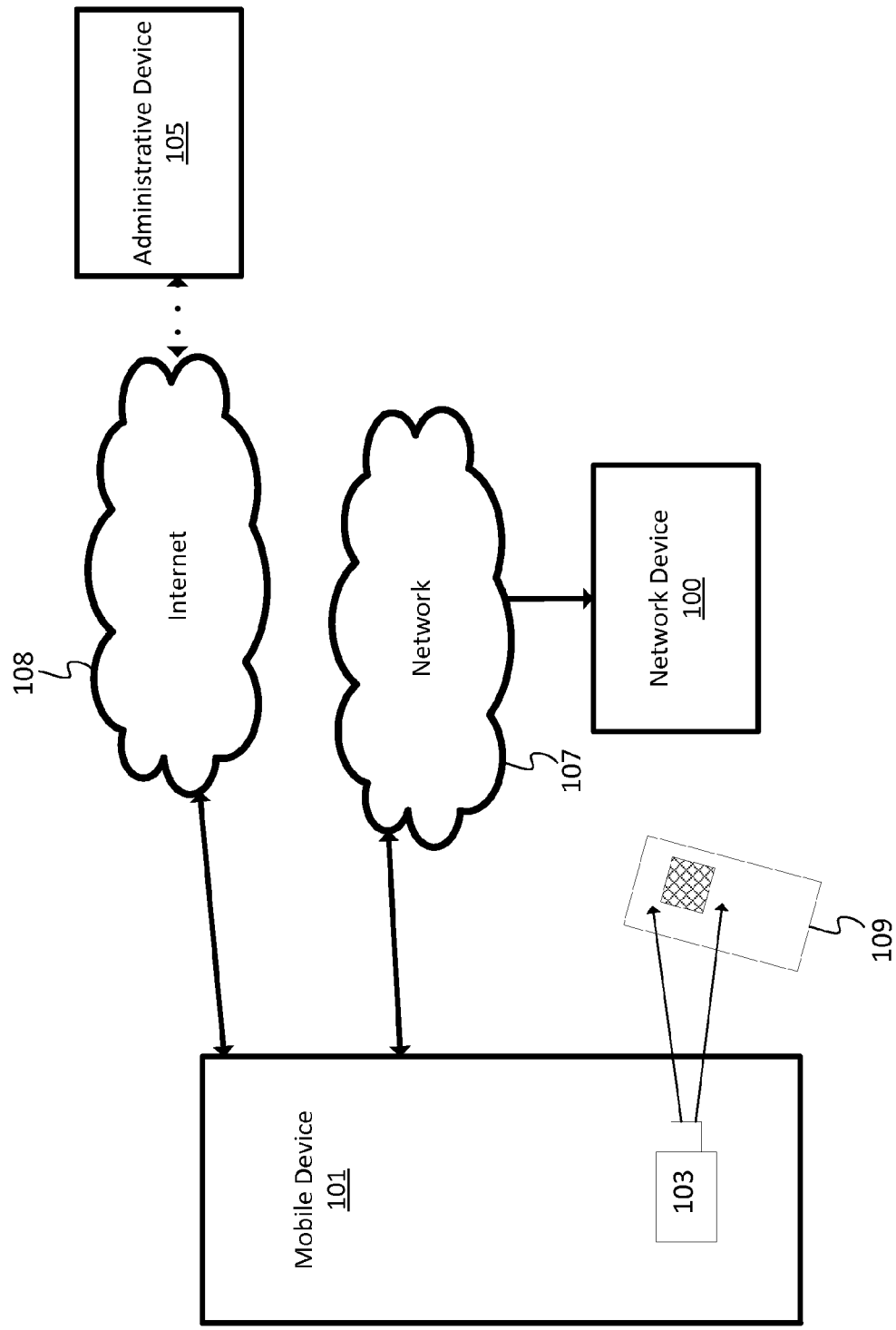
FIG. 1 illustrates an example system to configure a network device using a mobile device.

FIG. 1 illustrates an example system to configure a network device 100 using a mobile device 101. The mobile device 101 includes at least an image capture device 103 and hardware and software components to communicate with network 107 of the network device 100. The administrative device 105, which is optional, may be connected to the mobile device 101 via the Internet 108 or cellular network. The phrase "coupled with" includes directly connected to or indirectly connected through one or more intermediate components. Such intermediate components may include hardware and/or software-based components. Additional, different, or fewer components may be provided, such as multiple instances of network device 100.

The administrative device 105 generates provisioning data for the network device 100. The provisioning data is for installation and operation of the network device 100. The provisioning data may include access parameters for accessing a wireless network advertised by the network device 100. The provisioning data may include at least one network configuration setting for installing the network device 100.

The mobile device 101 is configured to receive the provisioning data. Various techniques may be used to deliver the provisioning data to the mobile device 101. In one example, the provisioning data is encoded into an optically scannable image. The optically scannable image is sent to a technician, customer, or user in an email, a text message, a file transfer, in hardcopy, or in another format. The message and/or the optically scannable image may be included in a printout 109. The image capture device 103 is configured to scan the image. The image capture device 103 may include a camera, a barcode scanner, a laser scanner, or another capturing device. The barcode scanner may include a light source and a photodiode, a series of sensors, or a charge-coupled device. In another example, the provisioning data is received at the mobile device 101 directly through a data connection with another network. The mobile device 101 may store the provisioning data for use when no data connection is available. In yet another example, the provisioning data is generated by the mobile device 101 using an application or other function.

The optically scannable image may be a quick response (QR) code, an augmented reality shape, a barcode, or another identifiable shape. A QR code is a matrix barcode or a barcode that extends in two-dimensions. An augmented reality shape is a basic shape with measurable geometries (e.g., an arrangement of dark colored rectangles or a light background). The optically scannable image may include text (e.g., optically recognizable alphanumeric characters).

The mobile device 101 is configured to decode the provisioning data from the optically scannable image to identify one or more access parameters for the network device 100 and/or one or more network configuration settings for installing the network device 100. The access parameters allow the mobile device 101 to access the wireless network through the network device 100. The access parameters include one or more of a private address, a type of radio, a frequency, a security type, a password, a default service set identifier (SSID), or another policy.

The mobile device 101 is configured to connect to the network 107 of the network device 100 using the access parameters. Once connected, the mobile device 101 is configured to transmit a configuration signal including one or more network configuration setting through the network 107 to the network device 100 for the installation of the network device 100. The network configuration settings allow the network device 100 to connect additional endpoints to the local area network and/or the Internet. The network configuration setting may include an SSID or hostname, a security method, a password or key, or other provisioning information.

Thus, when installing the access point, the installer connects power to the access point and scans the scannable image with the mobile device 101. This automatically associates the mobile device 101 to the default SSID of the network device 100 without user intervention. This also displays the configuration portal and passes the network configuration settings to the network device 100 without any input from the installer. The installer may activate the operation and/or may input selections for one or more settings, such as where the provisioning data indicates options.

Figure 2:
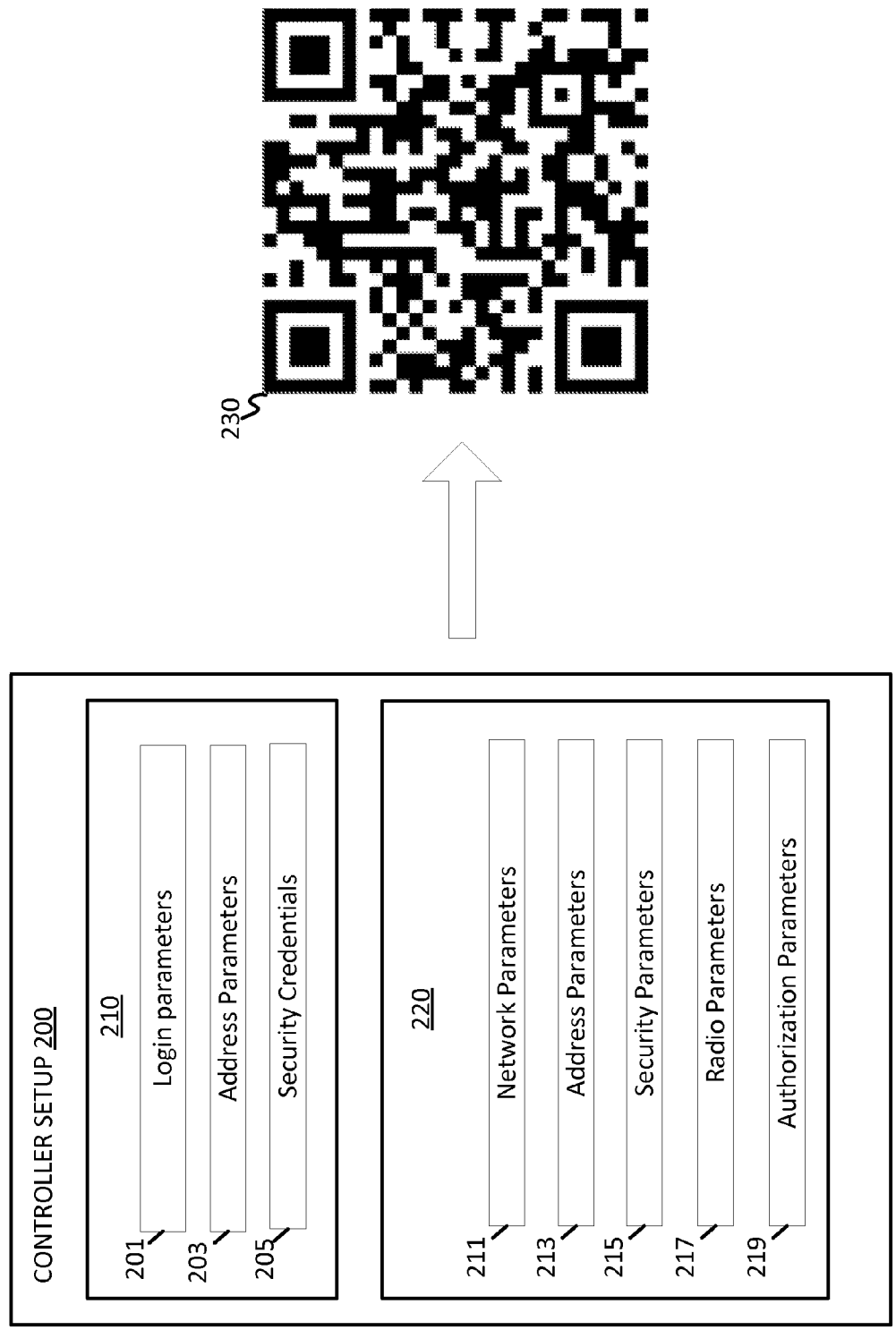
FIG. 2 illustrates an example controller setup.

FIG. 2 illustrates an example controller setup 200. The controller setup 200 includes an example set of access parameters 210 and/or network configurations 220 for the wireless network of the network device 100. The access parameters 210 include one or more of login parameters 201, address parameters 203, and security credentials 205. Additional, different, or less information may be included.

Any of the values for the access parameters 210 may be default values for initially obtaining access to the network device 100 and may be temporary. The controller setup 200 may be encoded by the administrative device 105 as an optically scannable image, as shown by QR code 230, or any of the alternative described above. In one implementation, the access parameters 210 are encoded in a first optically scannable image, and the network configurations 220 are encoded in a second optically scannable image.

The login parameters 201 include one or more usernames and passwords. The username and password include default values for the mobile device 101 to initially connect to the network device 100. The login parameters 201 may include a default SSID to connect to the network device 100.

The address parameters 203 may be a private address or a default address used to communicate with the network device 100. Examples for the private address include 192.168.0.1, 192.168.1.1, 192.168.2.1 or another address to establish the default gateway for the network device 100. The network device 100 broadcasts an SSID, and the mobile device 101 is configured to connect to the broadcasted SSID. Subsequently, the mobile device 101 connects to the network device 100 using the private address or default address of the network device.

The security credentials 205 may include an initial encryption key for initially exchanging data between the mobile device 101 and the network device 100. The encryption key may be for a wired equivalent privacy (WEP), Wi-Fi protected access (WPA or WPA2), or another technique. The encryption key may include a password, pass phrase, or other code. The security credentials 205 may be temporary and used only for an initial communication with the network device 100. The security credentials 205 may expire and an expiration date or may be disabled upon connection of the network device 100 with the network 107.

The network configurations 220 include one or more of network parameters 211, address parameters 213, security parameters 215, radio parameters 217, and authorization parameters 219. The network configurations 220 include settings for configuring the network device 100.

The network parameters 211 may include a network name such as an SSID (which may be changed from the default SSID). Any name may be used by the SSID. The network parameters 211 may also include a virtual LAN identification value. The address parameters 213 may include an address on network 107. The address may be an IP address assigned by a DHCP server.

The security parameters 215, which may be unrelated to security credentials 205, define a security method for the network device 100. The radio parameters 217 may include a frequency or a channel number for the network device 100. The frequency and/or channel may be selected to avoid interference with radios of other network devices in the area. The authorization parameters 219 may include an administrative code that allows the mobile device 101 to access the configuration of the network device 100. The network device 100 may enter a configuration mode in response to receiving the authorization parameters 219.

Figure 3A:
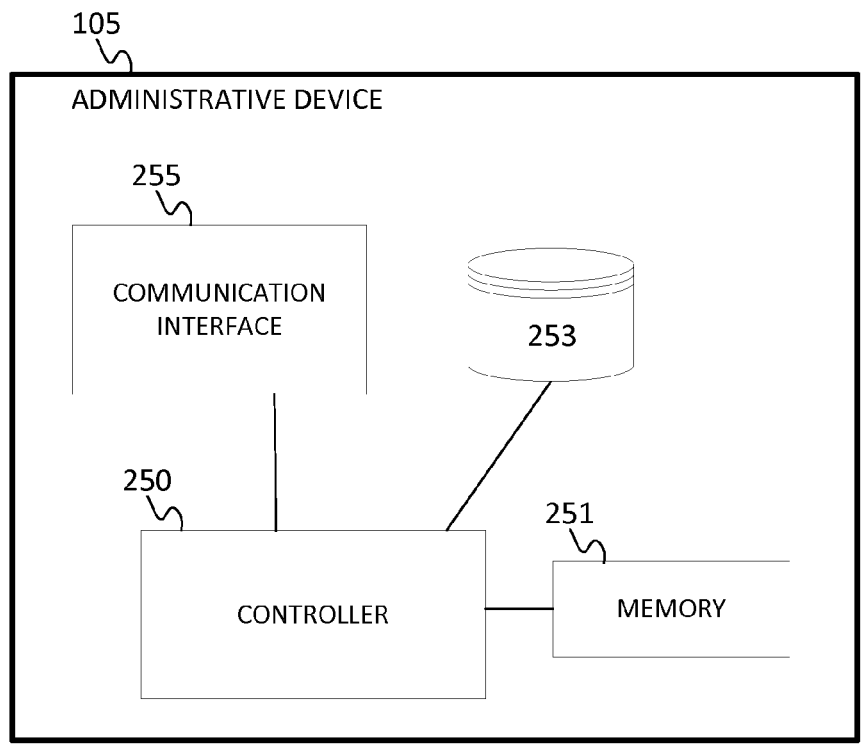
FIG. 3A illustrates an example administrative device of the system of FIG. 1.

FIG. 3A illustrates an example administrative device 105 of the system of FIG. 1. The administrative device 105 may include a controller 250, a memory 251, a database 253, and a communication interface 255. Additional, fewer, or different components may be included. The database 253 stores one or more network device identifiers with the respective access parameters and network configuration settings for the one or more network devices.

Figure 3B:
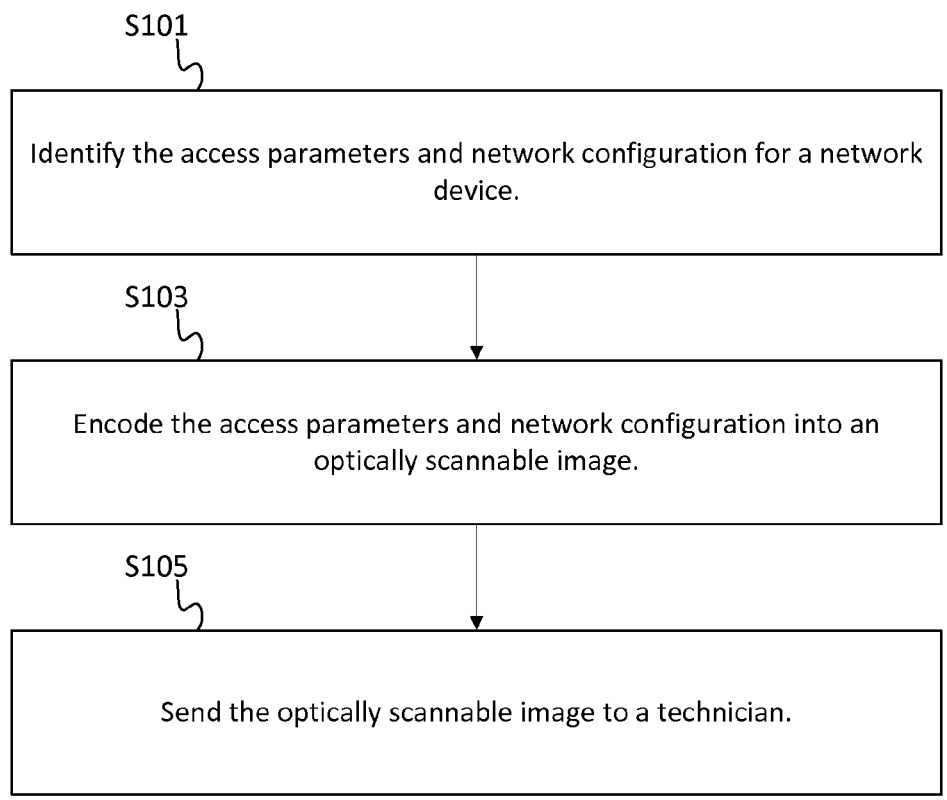
FIG. 3B illustrates an example flowchart to deliver the controller setup of FIG. 2.

FIG. 3B illustrates an example flowchart to obtain and deliver the controller setup 200 of FIG. 2 to the mobile device 101. Additional, fewer, or different acts may be included. The acts of FIG. 3B may be performed by administrative device 105 or another device, which may or may not be coupled with the network 107.

At act S101, the controller 250 identifies the access parameters 210 and the network configurations 220 for a particular network device. For example, the controller 250 may query the database 253, which pairs various models or manufacturers of network devices with access parameters. The database may also pair network configurations with specific networks or enterprises. The administrative device 105 may receive the access parameters 210 and network configurations 220 from a user and generate the optical image that is sent to the technician. The administrative device 105 may generate the provisioning data for the network device 100 remotely and without any connection to the network device 100.

At act S103, the controller 250 encodes the access parameters 210 and the network configurations 220 into an optically scannable image. In the example of a QR code as the optically scannable image, the encoding may be done by a standalone QR code generator software or a third party website with a QR code generator. Alternatively, the access parameters 210 and the network configurations 220 are generated and transmitted without optical encoding.

At act S105, the administrative device 105 sends the optically scannable image to a technician. The optically scannable image may be delivered to the technician in various ways. The optically scannable image may be emailed to the technician, who prints the optically scannable image and possibly other optically scannable images and brings the printouts to the worksite. Alternatively, the optically scannable image may be affixed to or printed on the network device 100, packaging associated with the network device 100, or inserts (e.g., instruction manuals, reference sheets) shipped with the network device 100.

Figure 4:
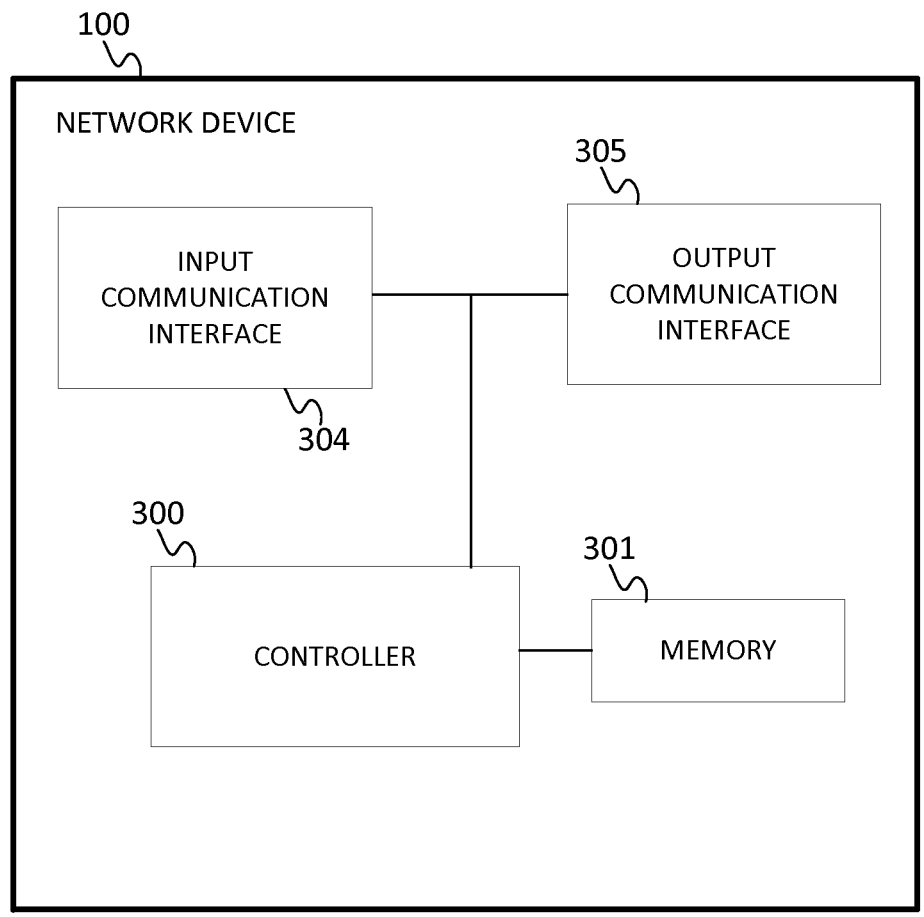
FIG. 4 illustrates an example network device of the system of FIG. 1.

FIG. 4 illustrates an example network device 100 of the system of FIG. 1. The network device 100 includes at least a memory 301, a controller 300, and an input communication interface 304 and an output communication interface 305. Additional, different, or fewer components may be provided. Different network devices may have the same or different arrangement of components. The network device 100 is an access point to be configured, such as a newly installed access point or a previously installed access point to be reconfigured.

Figure 5:
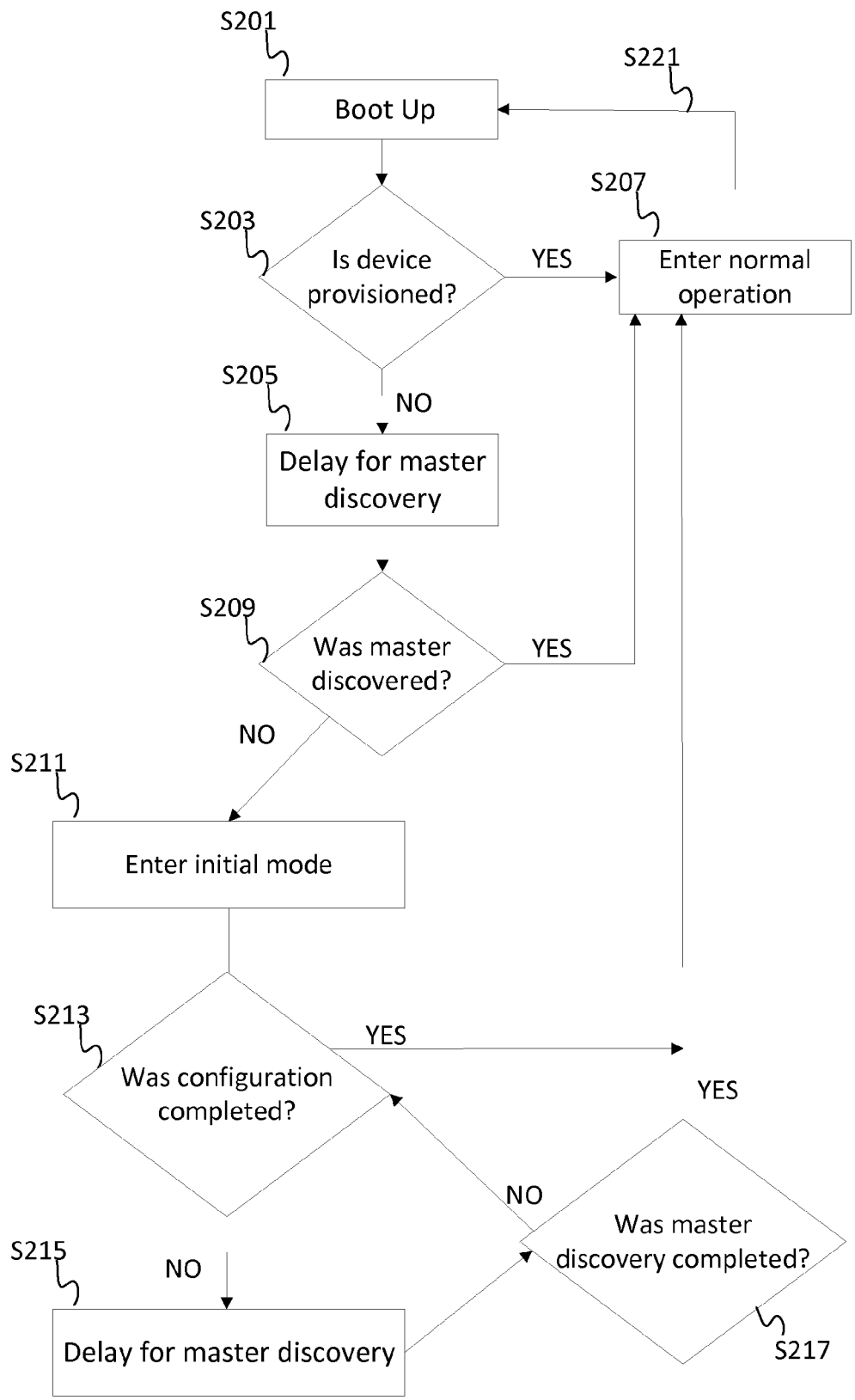
FIG. 5 illustrates an example flowchart for configuration of the network device of FIG. 4.

FIG. 5 illustrates an example flowchart for configuration of the network device 100 of FIG. 4. The acts in FIG. 5 may be performed by the network device 100. Additional, different, or fewer acts may be provided. The acts are performed in the order shown or other orders. The acts may also be repeated.

At act S201, the network device 100 receives power and boots up. At act S203, the controller 300 determines whether the network device 100 has been provisioned. The memory 301 may include a saved configuration which is accessed at act S203. In one example, the memory 301 includes a register or flag that is set based on whether the network device 100 has been provisioned.

At act S207, if the network device 100 has been provisioned, the network device 100 enters normal operation (e.g., Day 1 mode). At act S205, if the network device has not been provisioned, the network device 100 begins a delay time period for master discovery.

The master discovery process includes discovery of an already provisioned access point in the network. Master discovery may be performed by a discovery protocol (e.g., Cisco Control And Provisioning of Wireless Access Points (CAPWAP)). The discovery protocol may generate and send layer 3 broadcast messages to discover the master. If a master is discovered (i.e. an access point has already been provisioned), the access point does not enter the Day 0 provisioning state because the master can push the configurations to the newly provisioned access point.

At act S209, the controller 300 determines whether a master was discovered. If a master was discovered at act S209 or a saved configuration exists in memory at act S203, the network device 100 enters normal operation at act S207. If no master was discovered and/or no saved configuration exists after a predetermined time period (e.g., 1 minute, 5 minutes, or another value), the network device 100 has not been provisioned and proceeds to enter an initial mode (e.g., Day 0 mode) at act S211.

In the initial mode (e.g., Day 0 mode), the network device 100 broadcasts an SSID with default password protection using output communication interface 305. The SSID and the default password protection may be the login parameters 201 from the controller setup 200 that is sent to the mobile device 101 by way of the optically scannable image. The initial mode allows the mobile device 101 to connect to the network device 100 via the input communication interface 304 in a captive portal but does not allow the mobile device 101 to connect to upstream wired network services. In the initial mode, the network device 100 is configured to set up a DHCP pool to allocate addresses for joining clients.

The network device 100 in the initial mode delays for a predetermined time period (e.g., 1 minute, 5 minutes, or another value) to wait for the mobile device 101 to connect to the network device 100. The mobile device 101 connects to the network device 100 using the network access parameters 210 decoded from the optically scannable image. The network device 100 is configured to generate a connection confirmation message and send the confirmation message to the mobile device 101 using the output communication interface 305.

At act S213, the network device 100 determines whether a configuration has been complete. If a configuration has been completed, the network device enters normal operation. If no configuration has been completed, at act S215, the network device 100 may also wait for a mobile device to connect and provision the network device 100 using the network configuration 220 decoded from the optically scannable image. After entering the day 0 mode, the network device 100 returns to normal mode of operation if the provisioning data is received from the mobile device 101 or the network device 100 discovers a master device in the network.

At act S217, the controller 300 determines whether a master has been discovered and/or the network device 100 has been provisioned. If the network device 100 has been provisioned, the network device 100 moves to normal operation at act S207. If the network device 100 has not been provisioned, the process loops back to act S213, and additional delays are introduced to wait for the mobile device 101 to access and configure the network device 100 and/or a master to be discovered. The loop may repeat a predetermined number of times (e.g., 1, 2, 10, or any number).

The network device 100 saves the configuration in memory 301. Upon subsequent reboots of the network device 100, as shown by return loop S221, the network device 100 broadcasts the new SSID from the network configurations 220. During subsequent reboots, the device has already been provisioned and, after inquiry at act S203, the process proceeds to normal operation at act S207. A master switch is configured to clear the new SSID from memory 301. The master switch may be accessed through software or manually, through a physical switch on the network device 100.

Figure 6:
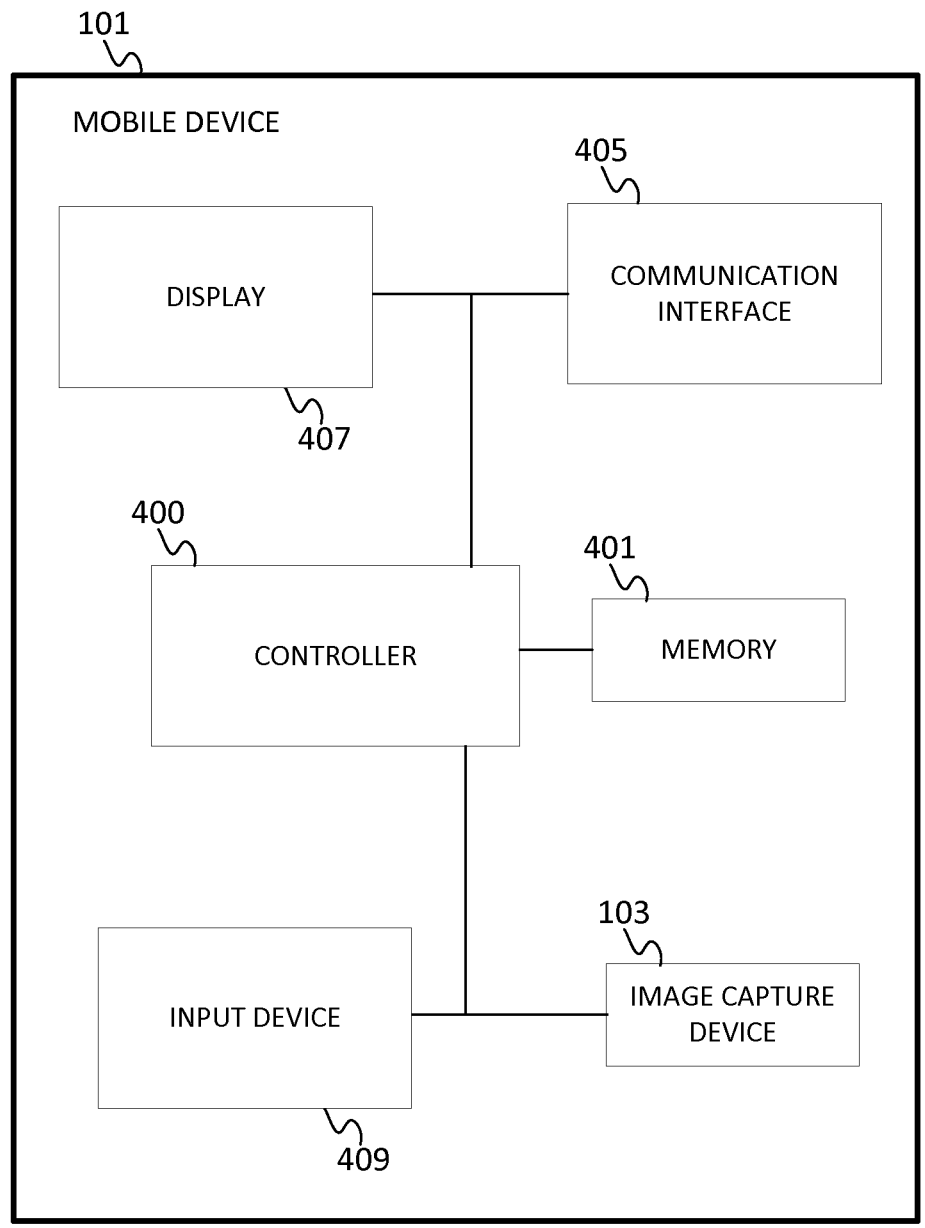
FIG. 6 illustrates an example mobile device of the system of FIG. 1.

FIG. 6 illustrates an example mobile device 101 of the system of FIG. 1. The mobile device 101 includes a controller 400, a memory 401, an image capture device 103, a communication interface 405, a display 407, and an input device 409. Additional, different, or fewer components may be provided. The mobile device 101 is a cellular telephone, personal digital assistant, tablet computer, purpose built configuration tool, laptop, or other mobile computing platform.

Figure 7:
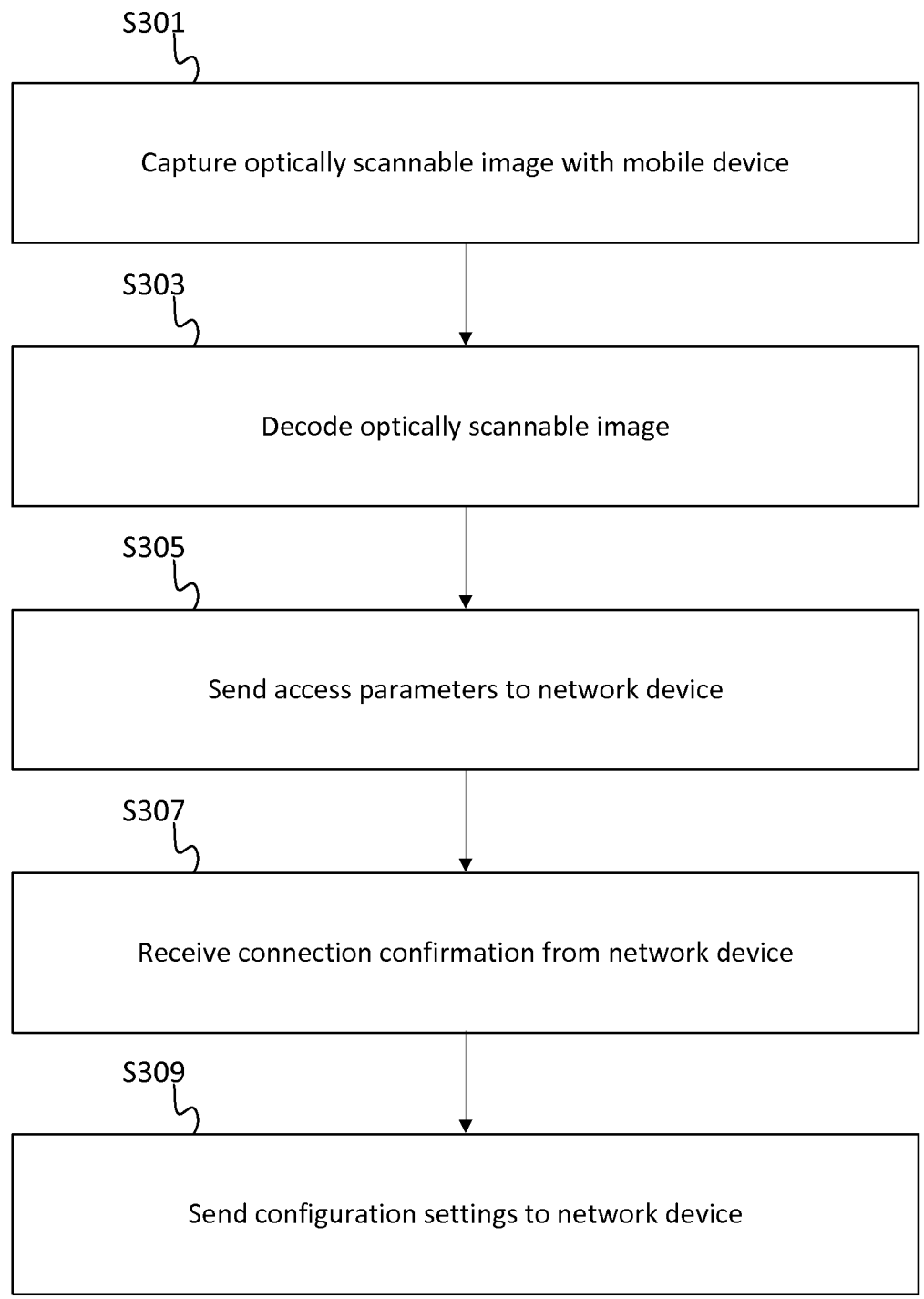
FIG. 7 illustrates another example flowchart for configuring a network device using a mobile device.

FIG. 7 illustrates another example flowchart for configuring a network device using a mobile device. Additional, different, or fewer acts may be provided. The acts are performed in the order shown or other orders. The acts may also be repeated. The following acts may be performed by the controller 400 via a mobile application installed on the mobile device 101 and stored in memory 401.

At act S301, the mobile application captures the optically scannable image. The image capture may be a photograph or a lower density scan (e.g., barcode). The mobile application may perform edge detection, object recognition, or another image processing technique in order to identify the optically scannable image from the photograph. Alternatively, data is received without capturing an image.

At act S303, the mobile application decodes the optically scannable image or received data in order to generate provisioning data. The optically scannable image (e.g., in the example of a QR code) may include a long string of text. The mobile application parses the text in order to identify the access parameters 210 and/or network configurations 220 for the wireless network of the network device 100. The mobile application may be configured to separate the access parameters 210 from network configurations 220. The optically scannable image may include a code indicative of the brand, model, or manufacturer of the network device 100. The mobile application may access a lookup table using the code to retrieve the access parameters 210 and/or network configurations 220. Alternatively, the values are provided from the image.

In one implementation, the provisioning data is encoded into a uniform resource locator (URL). The URL may include the network configurations 220. An example URL is "http://10.0.0.1/path/config.html?ip=20.0.0.1&ssid=ssidname&security=open".

At act S305, the mobile application, by way of communication interface 405, sends access parameters to the network device 100. The field "ssid=ssidname" is the SSID of the network device 100 that is broadcast by the network device 100. The mobile SSID in the URL may be broadcast after the network device 100 has been provisioned for other devices to connect under normal operation.

At act S307, the mobile application receives a connection confirmation from the network device 100. The connection confirmation may be an acknowledgement that the mobile device 101 is successfully connected to the network device 100 and/or the network device 100 is currently in the initial mode (e.g., Day 0 mode).

At act S309, the mobile application sends, by way of communication interface 405, configuration setting to the network device 100. The URL includes permanent setting fields. The network device 100 interprets the format of the URL, and the network device 100 adjusts settings based on the information in the URL. The field "ip=20.0.0.1" is an example of a permanent address for the network device 100 on the network 107. The field "security=" describes the security settings that the network device 100 uses for additional mobile devices to connect. The security settings may include an encryption method and/or a password.

The resource identifier "<path/config.html>" requests a resource from the network device 100. The provisioning is pushed to the network device 100 in name value pairs. The resource config.html is a web page that inputs the name value pairs and upon hitting submit this data is pushed to the network device 100. Thus, in order to install and provision the network device 100, the installer merely plugs in the network device 100 and scans the QR code or other scannable image with the mobile device 101. Further user confirmation is not, but may be, used.

The controllers (controller 250, the controller 300, and the controller 400) may include a general processor, digital signal processor, an application specific integrated circuit (ASIC), field programmable gate array (FPGA), analog circuit, digital circuit, combinations thereof, or other now known or later developed processor. The controllers may be a single device or combinations of devices, such as associated with a network, distributed processing, or cloud computing.

The memories the memory 251, the memory 301, and the memory 401 may be a volatile memory or a non-volatile memory. The memories may include one or more of a read only memory (ROM), random access memory (RAM), a flash memory, an electronic erasable program read only memory (EEPROM), or other type of memory. The memories may be removable such as a secure digital (SD) memory card.

The input device 409 may be one or more buttons, keypad, keyboard, mouse, stylist pen, trackball, rocker switch, touch pad, voice recognition circuit, or other device or component for inputting data to the mobile device 101. The input device 409 and the display 407 may be combined as a touch screen, which may be capacitive or resistive. The display 407 may be a liquid crystal display (LCD) panel, light emitting diode (LED) screen, thin film transistor screen, or another type of display.

In addition to ingress ports and egress ports, the communication interfaces may include any operable connection. An operable connection may be one in which signals, physical communications, and/or logical communications may be sent and/or received. An operable connection may include a physical interface, an electrical interface, and/or a data interface.

The network may include wired networks, wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

The memories are examples of computer readable media or non-transitory computer readable media. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a)hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
scanning, at a mobile device, an optically scannable image including provisioning data encoded for installation and operation of a network device;
decoding, at the mobile device, the provisioning data to identify at least one access parameter for the network device;
accessing, by the mobile device, a wireless network of the network device according to the at least one access parameter;
transmitting, from the mobile device, a configuration signal including at least one network configuration setting through the wireless network to the network device for the installation of the network device;
generating a uniform resource locator from the provisioning data; and
accessing data stored in the network device using a browser of the mobile device and the uniform resource locator,
wherein the at least one network configuration setting encoded in the provisioning data includes a network name and wherein the provisioning data includes an initial service set identification of the network device.

2. The method of claim 1, further comprising:
decoding the provisioning data to identify the at least one network configuration setting for the network device.

3. The method of claim 2, wherein the at least one network configuration setting and the at least one access parameter are encoded into the optically scannable image.

4. The method of claim 3, wherein scanning the optically scannable image comprises:
capturing an image including the optically scannable image with a camera.

5. The method of claim 4, wherein the optically scannable image includes a quick response code.

6. The method of claim 1, further comprising:
receiving a message including the optically scannable image including provisioning data encoded for installation and operation of the network device.

7. An apparatus comprising:
a mobile device controller configured to receive provisioning data from an optically scannable image, the provisioning data encoded for installation and operation of a network device and decode the provisioning data to identify at least one access parameter for the network device and at least one network configuration setting for the network device, wherein the at least one network configuration setting includes an initial service set identification of the network device and the at least one access parameter includes a network name; and
a communication interface configured to automatically access the network device according to the access parameter and automatically transmit a configuration signal including the at least one network configuration setting to the network device for the installation of the network device,
wherein the mobile device controller is configured to generate a uniform resource locator from the provisioning data and access data stored in the network device using a browser and the uniform resource locator.

8. The apparatus of claim 7, further comprising:
an image capture device configured to capture the optically scannable image including the provisioning data.

9. The apparatus of claim 8, wherein the image includes a quick response code.

10. The apparatus of claim 7, wherein the at least one access parameter includes a default name for a network and the at least one network configuration setting includes a provisioned name for the network.

11. The apparatus of claim 7, wherein the provisioning data includes a uniform resource locator that accesses a configuration mode of the network device.

12. A method comprising:
identifying at least one access parameter for a network device, wherein the at least one access parameter includes a network name;
identifying at least one network configuration setting for the network device, wherein the at least one network configuration setting includes an initial service set identification of the network device;
encoding the at least one access parameter and at least one network configuration setting into an optically scannable code; and
electronically providing the optically scannable code to a technician, wherein a uniform resource locator is generated from the provisioning data to access data stored in the network device using a browser and the uniform resource locator,
wherein the optically scannable code is configured to be scanned by a mobile device of the technician to identify the at least one access parameter and the at least one network configuration setting.

13. The method of claim 12, wherein the mobile device is configured to, in response to the optically scannable code, access a network through the network device and transmit a configuration signal including the at least one network configuration setting through the network to the network device.

14. The method of claim 12, wherein providing the optically scannable code comprises emailing the optically scannable code as an image.

15. The method of claim 12, wherein the at least one network configuration setting includes a security encryption and a password.

16. An apparatus comprising:
a database configured to associate at least one network device identifier with at least one access parameter for a network device and at least one network configuration setting for the network device wherein the at least one network configuration setting includes an initial service set identification of the network device and the at least one access parameter includes a network name; and
a controller configured to encode the at least one access parameter and the at least one network configuration setting into an optically scannable code,
wherein the controller is configured to generate an email including the optically scannable code to a technician, wherein the optically scannable code is configured to be scanned by a mobile device of the technician to identify the at least one access parameter and the at least one network configuration setting,
wherein a uniform resource locator is generated from the scannable code to access data stored in the network device using a browser and the uniform resource locator.

17. The apparatus of claim 16, wherein the access parameter includes a default address and a default password for the network device.

* * * * *